C. L. WEBER, JR 3,193,333

FLUID PRESSURE BRAKE CONTROL APPARATUS
WITH EMPTY AND LOAD CHANGEOVER

Filed Feb. 26, 1963

INVENTOR.
Charles L. Weber Jr.
BY Joseph Januszkiewicz
Attorney 3,193,333
FLUID PRESSURE BRAKE CONTROL APPARATUS WITH EMPTY AND LOAD CHANGEOVER
Charles L. Weber, Jr., Pittsburgh, Pa., assignor to Westinghouse Air Brake Company, Wilmerding, Pa., a corporation of Pennsylvania
Filed Feb. 26, 1963, Ser. No. 261,025
12 Claims. (Cl. 303—23)

This invention relates to fluid pressure brake apparatus for railway vehicles and more particularly to load-controlled fluid pressure brake apparatus.

In the design of empty and load brake equipment for a railway car, difficulty was encountered because the various brake equipment units were of a specialized nature. Such difficulty even arose in using a changeover valve device designed for a single capacity brake equipment or a compensating type brake equipment, particularly in the initial application of the brakes in the compensating type brake equipment, since initial pressurization of the larger chamber would be offset in part by pressurization of the smaller chamber which resulted in failure of bringing the brake shoes into engagement with the tread of the wheel. A further problem was presented through the use of large capacity brake cylinders compared to those of relatively small capacity, as well as the use of brake cylinders having pistons with relatively large variation in piston travel such as from 2 to 5 inches which required a relatively flexible unit that would handle efficiently a varying capacity brake unit.

It is an object of this invention to provide a new and improved change-over valve device having a replaceable component which makes such a valve device applicable for use on brake equipment having large capacity cylinders with a relatively large variable stroke as well as for brake equipment having single capacity brake equipment or compensating type brake equipment, wherein only the replaceable component need be changed to correspond to the type of brake unit used.

In accordance with this invention, the change-over valve device comprises a replaceable differential relay valve unit, which unit contains a normally closed valve which is unseated by energization of a relay valve unit to connect pressurized fluid from a source to the brake cylinders for effecting a brake application. The differential relay has control diaphragms of different effective areas such as to provide different actuating forces so that upon selective pressurization of one or both of such diaphragms different braking ratios are established subject to subsequent balancing by a balancing chamber in the differential relay valve unit which permits the normally closed valve to reseat itself after the established braking ratio selected completes its application to the brake cylinders. The change-over valve device additionally contains a selector valve device which cooperates with a weighing device which determines a load or no-load condition of a railway car thereby positioning the selector valve to selectively condition one or both of such control diaphragms for operating the differential relay valve unit. A cut-off valve responsive to a building up of pressure initiates the weighing device to perform its function by unlocking the selector valve device and actuates the weighing device for positioning the selector valve device with means for isolating the weighing device after further build-up of pressure while simultaneously locking the selector valve device in its registered position.

A modificaiton of the above unit is similarly a duplicate of the above-described embodiment except for the differential relay valve unit which, in the present embodiment, has the normally closed valve inoperative in one position of the selector valve device such that the main chambers only of the brake cylinders are connected directly to an air reservoir upon a braking application, however, operative in the other position of the selector valve device to actuate the normally closed valve which connects pressurized fluid to a compensating chamber in the brake cylinder to provide a different braking ratio than when braking is effected solely by the connection of the main chambers to the air reservoir.

A further modification of the original change-over valve device comprises a similar device in all respects to the above-described device except that one pressure source, controlled by a conventional brake control valve device, is connected directly to the closed valve for actuation of the brake cylinder and connected to the selector valve device for selective pressurization of the control diaphragms to provide different braking ratios dependent on whether the selector valve device registers a loaded or unloaded condition of a railway car as in the original embodiment.

Figure 1:
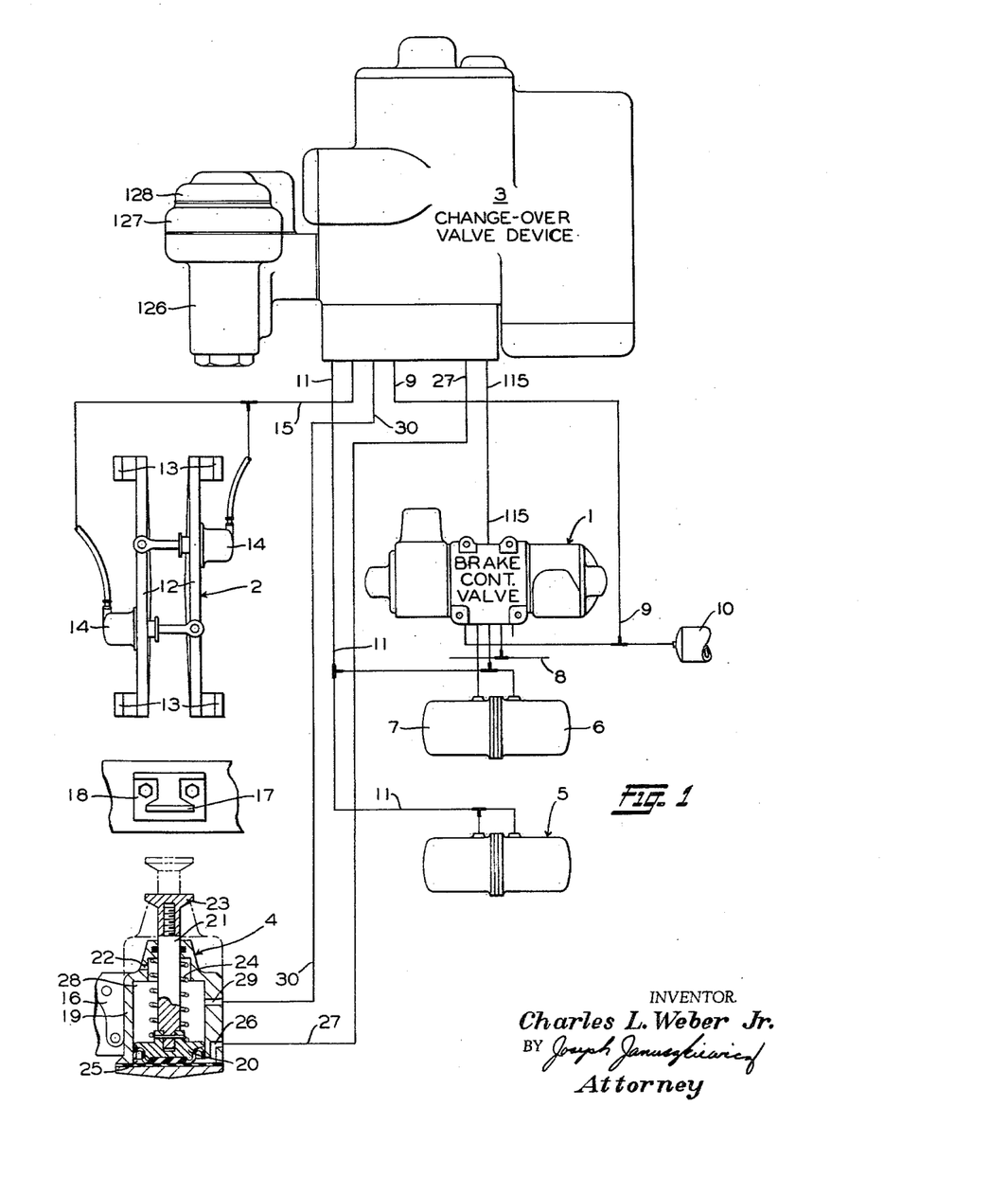
FIG. 1 is a diagrammatic view partly in section of a load-controlled fluid pressure brake apparatus constructed in accordance with the principles of this invention.

As shown in FIG. 1 of the drawings, the fluid pressure brake equipment comprises an AB type brake control valve device 1, brake means or air brake rigging 2, a load change-over valve device 3, load measuring device 4, air reservoir 5, auxiliary reservoir 6, emergency reservoir 7, and a brake pipe 8.

The AB brake control valve device 1 is of the usual well known type which responds to the charging of the brake pipe to charge the respective auxiliary and emergency reservoirs 6 and 7, and which responds to a reduction in pressure in brake pipe 8 to direct pressurized fluid via a brake cylinder supply pipe 9 to the load change-over valve device 3 in a manner well known and understood in the art. In addition, the brake cylinder supply pipe 9 is connected to a displacement volume reservoir 10 to compensate for the limited volume acted upon in change-over valve device 3 by the pressurized fluid from the respective auxiliary and emergency reservoirs 6 and 7. A conduit 11 has branch conduits interconnecting the air reservoir 5, the auxiliary reservoir 6, the AB control valve device 1 and a passageway in the change-over valve device 3.

The brake rigging 2 comprises a pair of brake beams 12 that normally extend crosswise of the railway car in parallel spaced relationship to each other. The brake beams 12 are adapted to be movably supported at each end on the side frame members of a car truck in a manner well understood in the art. Supported adjacent to the outer ends of each brake beam 12 are brake heads which carry brake shoes 13, respectively, for contact with the tread of an associated wheel. Each brake beam 12 has suitably rigidly secured thereto a brake cylinder 14, in which brake cylinder 14 is reciprocably mounted a piston whose piston rod is secured to the oppositely disposed brake beam 12 such that pressurization of the respective pressure chambers of each brake cylinder 14 causes the respective brake shoes 13 to contact the associated adjacent wheels for a braking application in a manner well understood in the art. Pressurized fluid is supplied to the respective brake cylinders 14 via a conduit 15 connected to a passageway in the change-over valve device 3.

The load measuring device 4 is mounted on a suitable sprung portion of a railway car, such as the car truck bolster, by a bracket 16 substantially in line with a stop member 17. Stop member 17 is suitably mounted on a bracket 18, which bracket 18 is suitably attached to an unsprung part of the car truck, such as the side frame of the car truck. Engagement between stop member 17 and the load measuring device 4 is achieved in a manner to be described.

The load measuring device 4 comprises a vertically disposed cylindrical strut cylinder 19, in which strut cylinder 19 is mounted a control piston 20 having a piston rod 21 extending through and slidably guided in the non-pressure head formed integral with the upper end of cylinder. The upper end portion of strut cylinder 19 closely adjacent the non-pressure head is vented to atmosphere via a port 22. The uppermost end portion of piston rod 21 has a stop member 23 suitably adjustably mounted thereon for engagement with stop member 17. A spring 24 encompassing the piston rod 21 has its upper end seated on the non-pressure head of strut cylinder 19 and its lowermost end resting on the piston 20, whereby spring 24 urges the piston 20 to its lowermost position in the strut cylinder 19. A pressure chamber 25 at the lower end portion of the strut cylinder 19 defined by the piston 20 and the lowermost end portion of the cylinder 19 is connected via a passageway 26 to a conduit 27. A non-pressure chamber 28 above the piston 20 is connected via a passageway 29 to a conduit 30 for connection to the change-over valve device 3. With the railway car loaded, the stop member 17 is a greater distance from the stop member 23 than when the railway car is empty, since the stop member 23 is on the sprung portion of the railway car and the springs supporting the sprung portion are compressed in accordance with the degree of loading on the sprung portion, which, in the case of a loaded condition of a railway car, would be relatively greater than under an unloaded or empty condition of a railway car.

When the railway car is loaded, the position of the strut cylinder 19 relative to the bracket 18 on the unsprung portion of the car truck is such as is shown in full lines in FIG. 1, wherein the stop member 23 on the movable piston rod 21 is adapted to move into abutting engagement with the stop support member 17 upon pressurization of chamber 25 via conduit 27. Such pressurization of chamber 25 moves piston 20 upwardly as viewed in FIG. 1 to connect passageway 26 with passageway 29 and conduit 30. When the railway car is empty or partially unloaded, the strut cylinder 19 relative to the unsprung portion 18 of the car assumes a position such that the stop member 23 will be relatively close to stop member 17, since the car springs are not compressed as much as when the car is loaded, such that upon pressurization of chamber 25 via conduit 27, piston 20 will move upwardly in strut cylinder 19 only a limited amount due to engagement of stop member 17 by stop member 23. In this position of piston 20, passageway 29 will not be uncovered and communication between passageways 26 and 29 will be closed.

The term "empty railway car" as used throughout the specification designates a partially loaded or empty condition of a railway car such that on pressurization of chamber 25, the upward movement of piston 20 is insufficient to establish communication between passageways 26 and 29, whereas, a loaded railway car designates a railway car that is sufficiently loaded such that on pressurization of chamber 25, the upward movement of piston 20 is sufficient to establish communication between passageways 26 and 29.

The change-over valve device 3 (FIG. 2) comprises a sectionalized casing 31 having a pair of stepped bores 32, 33 in the respective end portions thereof, and a pair of intersecting stepped bores 34 and 35 in the central portion thereof. Stepped bore 32 has a reduced bore portion 36 in the upper end thereof, an enlarged bore portion 37 in the intermediate portion thereof, and an intermediate size bore 38 in the lowermost end portion thereof. The lowermost end portion of bore 32 has an upwardly extending raised portion 39 which acts as a stop member for a purpose to be described.

Figure 2:
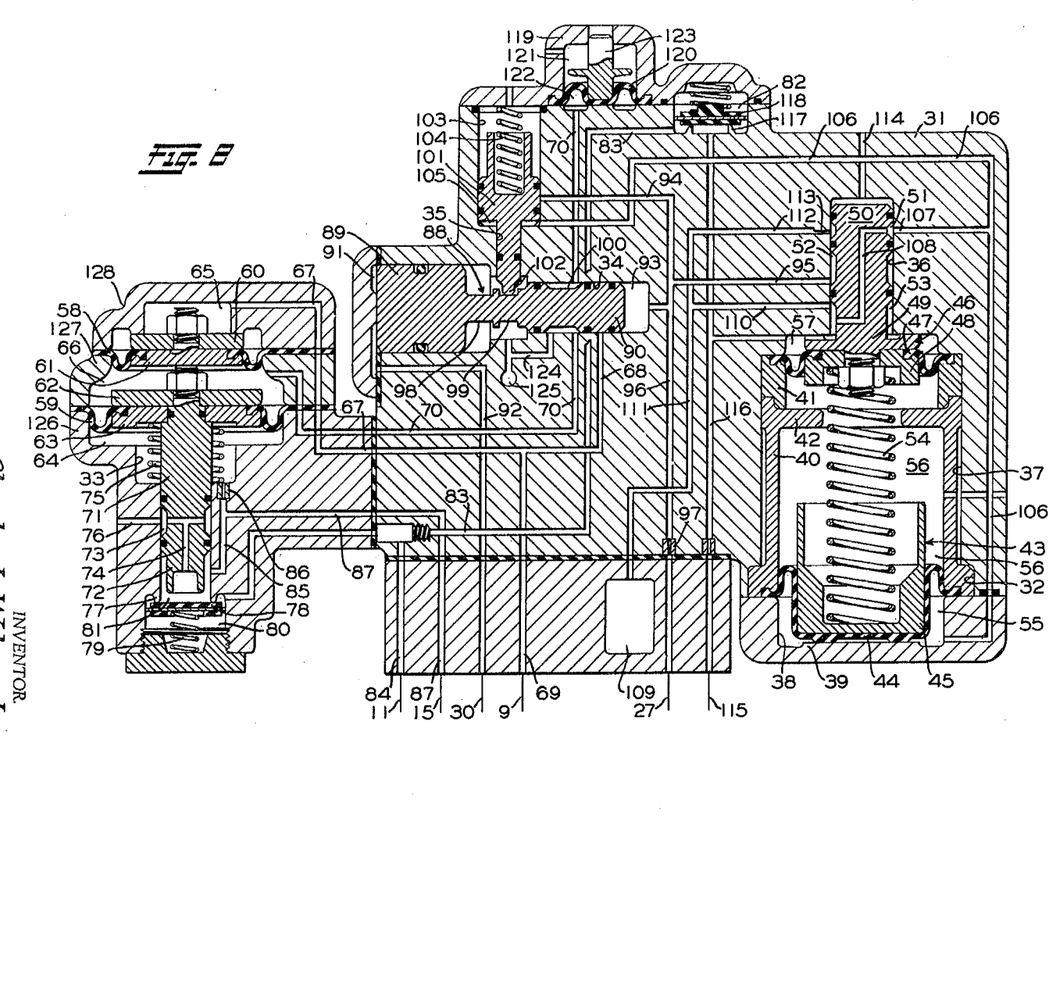
FIG. 2 is a side elevational cross-sectional view of the change-over valve device shown in FIG. 1.

Enlarged bore portion 37 of stepped bore 32 houses a lower tubular member 40 and an upper tubular member 41, which tubular members 40 and 41 have their adjacent ends abutting each other. The lower end portion of lower tubular member 40 has an outwardly extending flange portion which is suitably secured to the casing 31 in an annular recess thereof. The upper end portion of upper tubular member 41 abuttingly engages an annular shoulder on the upper end portion of enlarged bore portion 37. The upper end portion of lower tubular member 40 adjacent the lower end portion of tubular member 41 has an inwardly extending annular flange portion 42 for a purpose to be described.

Movably mounted in the lower end portion of stepped bore 32 is a movable abutment 43 comprising a resilient cup-shaped diaphragm 44 whose outer peripheral edge portion is clamped between the lowermost end portion of tubular member 40 and an annular shoulder on the lower end portion of enlarged bore 37, and a cylindrical follower member 45 suitably seated on the inner cup-shaped portion of resilient cup-shaped diaphragm 44. Movably mounted in the upper end portion of bore 32 is a movable abutment 46 having a resilient diaphragm 47 whose outer peripheral edge is clamped between the uppermost end portion of tubular member 41 and the shoulder on the upper end portion of enlarged bore portion 37. The inner peripheral edge of resilient diaphragm 47 is suitably clamped between a pair of follower members 48 and 49, which follower members 48 and 49 are suitably rigidly connected together. Follower member 49 has an upwardly extending valve stem 50 which is slidably and sealingly mounted in the reduced bore portion 36. Valve stem 50 has spaced peripheral annular grooves 51, 52 and 53 for the control of fluid in a manner to be described. A spring 54, located in the central portion of bore 32 and having its lower end engaging the cylindrical follower member 45 and its upper end engaging the follower member 48, biases the respective movable abutment members 43 and 46 in opposite directions to the positions in which they are shown in FIG. 1. Movable abutment 43 cooperates with the casing 31 and the bore 32 to define a pressure chamber 55 in the bore portion 38 and a pressure chamber 56 in the enlarged bore portion 37. Chamber 56 is vented to atmosphere via a port through the tubular member 40 and a port in the casing adjacent thereto for constantly maintaining chamber 56 at atmospheric pressure. Movable abutment 46 cooperates with the sectionalized casing 31 to define an upper pressure chamber 57 and a lower chamber coextensive with the pressure chamber 56.

The movable abutments 43 and 46 with their respective followers and valve stem 50 will hereinafter be additionally referred to as a cut-off valve device.

Stepped bore 33 is located in the left-hand portion of sectionalized casing 31, which portion is replaceable as a unit as will become evident upon further explanation.

Suitably located in stepped bore 33 is a differential relay valve device having a pair of spaced resilient diaphragms 58 and 59. Diaphragm 58 has its outer peripheral edge clamped between two portions of the sectionalized casing 31 and its inner peripheral edge clamped between an upper follower disc 60 and a lower follower disc 61. Diaphragm 59 also has its outer peripheral edge clamped between two portions of the sectionalized casing 31 and its inner peripheral edge clamped between an upper follower disc 62 and a lower follower disc 63. Resilient diaphragm 59 and lower follower disc 63 cooperate with the casing 31 and the bore 33 to define a lower chamber 64, while resilient diaphragm 58 and follower disc 60 cooperate with the casing 31 and the bore 33 to define an upper chamber 65. Diaphragm 58 and lower follower disc 61 cooperate with the diaphragm 59 and upper follower disc 62 along with the casing 31 and the bore 33 to define an intermediate chamber 66 therebetween. The effective area of diaphragm 58 and its follower discs is less than the effective area of diaphragm 59 and its follower discs to thereby provide a differential relay valve device whose effective force developed for displacement of a valve stem connected thereto is dependent on which one of the chambers 65 and 66 is pressurized. Upper chamber 65 is connected to the stepped bore 34 in the central portion of casing 31 via passageways 67 and 68 and to the supply pipe 9 via a passageway 69. Intermediate chamber 66 is connected to the stepped bore 34 via a passageway 70.

Lower follower disc 63 has a valve stem 71 extending downwardly therefrom, which valve stem 71 has a reduced end portion 72 and an annular groove 73 around the intermediate portion thereof. The lower portion of valve stem 71 has a bore 74 communicating the annular groove 73 with a recess in the central lower end portion thereof for a purpose to be described. Stepped bore 33 houses a spring 75 which has its one end seated on a recessed shoulder portion of the bore 33 and its other end engaging lower follower disc 63, thereby biasing follower disc 63, diaphragm 59 and follower disc 62 upwardly into engagement with follower disc 61, which follower disc 61 along with follower disc 60 is biased into engagement with an annular shoulder on upper end portion of bore 33. In the normal biased position of valve stem 71, annular groove 73 is vented to atmosphere via a port 76, extending through casing 31. The lower end portion of stepped bore 33 has a downwardly extending annular valve seat member 77. Located below valve seat member 77 in bore 33 is a disc valve 78 which is normally biased upwardly into engagement with the valve seat member 77 by a spring 79. Valve 78 cooperates with the lower end portion of the bore 33 to define a lower chamber 80 and an upper chamber 81.

Chamber 80 is connected to a chamber 82 in the upper central portion of the sectionalized casing 31 via a passageway 83 and is connected to the air reservoir 5 via conduit 11 and a passageway 84. Chamber 81 is connected to chamber 64 via a passageway 85 having therein a choke 86, and to conduit 15 via a branch passageway 87 from passageway 85.

Slidably mounted in bore 34 is a selector valve device 88 having spaced-apart pistons 89 and 90, wherein piston 89 is larger in effective area than piston 90. Piston 89 cooperates with the larger end of stepped bore 34 in sectionalized casing 31 to define a chamber 91, which chamber 91 is connected to chamber 28, in the intermediate portion of strut cylinder 19 (FIG. 1), via passageway 92 and conduit 30. Piston 90 cooperates with the smaller end of stepped bore 34 in sectionalized casing 31 to define a chamber 93, which chamber 93 is connected to stepped bore 35 via a passageway 94, and connected to bore 36 via passageway 94 and a passageway 95. Chamber 93 is also connected to the chamber 25 in strut cylinder 19, via a passageway 96 having therein a choke 97, conduit 27 and passageway 26. The intermediate portion of selector valve device 88 has a plurality of peripheral annular grooves 98, 99 and 100, with the peripheral annular groove 100 being so disposed within the smaller end of stepped bore 34 as to connect passageway 68 to passageway 70 in a manner to be described. A latch piston 101 reciprocably mounted in bore 35 has a lower end portion 102 which cooperates selectively with peripheral annular grooves 98 and 99 for locking selector valve device 88 in one or the other of two positions.

Stepped bore 35 has a lower reduced bore portion and an upper enlarged bore portion 103. A spring 104 suitably located in the upper enlarged bore portion 103 has its lower end engaging the upper end portion of latch piston 101 to thereby bias latch piston 101 downwardly into enlarged bore portion 103 so that the lower end portion 102 thereof engages either peripheral annular groove 98 or 99. The intermediate portion of latch piston 101 cooperates with the lower end portion of enlarged bore portion 103 to define a chamber 105, which chamber 105 is connected to bore 36 via passageways 106 and 107 and to the peripheral annular groove 51 on valve stem 50 when valve stem 50 is in the position in which it is shown in FIG. 2. Peripheral annular groove 51 is connected to peripheral annular groove 53 via a passageway 108 which extends through the valve stem 50. Peripheral annular groove 53 is connected to chamber 57 and connected to a strut cylinder reservoir 109 in the lower portion of sectionalized casing 31 via passageways 110 and 111. Passageway 111 has a branch passageway 112 connected to the upper end portion of bore 36 and to the peripheral annual groove 51 on valve stem 50 via a restricted opening 113. The upper end portion of bore 36 is vented to atmosphere via a port 114. Chamber 57 is connected to a charging pipe 115 via a passageway 116. In accordance with the usual practice, the charging pipe 115 is constantly open to the brake pipe 8 by way of an air strainer (not shown) in the brake control valve device 1.

With the movable abutments 43 and 46 in their normal positions as shown in FIG. 2, fluid under pressure flows from the brake pipe 8 through the brake control valve device 1, thence via charging pipe 115, through passageway 116 to charge chamber 57, and thence via passageways 110 and 111 to charge the strut cylinder reservoir 109. Fluid under pressure also flows from chamber 57 via passageway 108 in the stem portion 50, and passageways 106 and 107 to charge chambers 55 and 105.

Chamber 82 in the upper central portion of sectionalized casing 31 has an annular valve seat 117 located on the bottom surface thereof, which valve seat 117 is cooperative with a spring-biased, normally seated supply reservoir charging valve 118 to charge the air reservoir 5 via fluid supplied from charging pipe 115 and passageway 116. Spring-biased charging valve 118, a one-way valve, normally engages the annular valve seat 117 and closes communication between passageways 116 and 83 except for pressurized fluid from passageway 116 charging passageway 83.

Whenever pipe 115 is charged, the lower central portion of chamber 82 is charged to thereby unseat charging valve 118 and connect air reservoir 5 to the charging pipe 115 via passageways 116, past charging valve 118, through passageways 83 and 84 and conduit 11, to thereby facilitate charging the air reservoir 5 to its maximum pressure after a braking application.

Sectionalized casing 31 cooperates with an inverted cup-shaped housing 119 on its upper end portion, as viewed in FIG. 2, to clamp the outer peripheral edge of a resilient diaphragm 120 therebetween to define an upper chamber 121 and a lower chamber 122. Suitably located in chamber 121 is an indicator plunger 123 suitably connected to the resilient diaphragm 120 for movement therewith. The upper end portion of plunger 123 is guided for movement through a bore in the cup-shaped housing 119 such that pressurization of chamber 122 moves diaphragm 120 and indicator plunger 123 upwardly as viewed in FIG. 1, to thereby move the upper end portion of indicator plunger 123 through the bore in the upper end portion of cup-shaped housing 119 to visually indicate a loaded condition of a railway car.

As shown in FIG. 2, chamber 122 is connected by passageway 70 to annular groove 100, and via a passageway 124 in the central portion of casing 31 to an exhaust port 125. Upon rightward movement of selector valve device 88, as viewed in FIG. 2, the land portion between annular grooves 99 and 100 closes communication between passageways 70 and 124, thereby conditioning chamber 122 for pressurization to indicate a loaded condition of a railway car in a manner to be described.

In operation, the brake equipment described is initially charged by supplying fluid under pressure via the brake pipe 8 to the brake control valve device 1, and through such valve device 1, in the usual manner, to the auxiliary and emergency reservoirs 6 and 7, respectively, and to the air reservoir 5. A second charging communication for charging the auxiliary reservoir 6 and air reservoir 5 from the brake pipe 8 is also provided via brake control valve device 1, pipe 115, passageway 116, past charging valve 118, passageways 83 and 84, and conduit 11 to thereby supplement the charging of the auxiliary reservoir 6 and air reservoir 5 in the manner described above. In addition, pressurized fluid from passageway 116 flows into chamber 57 and thence via annular groove 53, passageway 110, and passageway 111 to charge strut cylinder reservoir 109 while simultaneously flowing through annular groove 53 and thence via passageway 108 in the valve stem 50 to passageway 106 which conducts pressurized fluid simultaneously to chambers 105 and 55.

Pressurization of strut cylinder reservoir 109 provides a pressure supply source which assures locking of the selector valve device 88 in one or the other of its two positions during a weighing cycle in a manner to be described. As the brake pipe pressure is being increased, chambers 105 and 55 are pressurized via passageways 108, 107 and 106. Since diaphragm 44 is larger in effective area than diaphragm 47, movable abutment 43 moves upwardly prior to the downward movement of movable abutment 46. The increase in brake pipe pressure increases the pressures in chambers 105 and 55, causing the upward movement of movable abutment 43 to compress spring 54, and the upward movement of latch piston 101 to compress spring 104. When the pressure build-up under latch piston 101 and in chamber 105, overcomes the force of spring 104, latch piston 101 moves upwardly and disengages the lower end portion 102 from selector valve device 88 to thereby leave selector valve device 88 free to move. Such upward movement of latch piston 101 communicates passageway 106 with passageway 94 to thereby conduct pressurized fluid from the brake pipe 8, via pipe 115, passageway 116, chamber 57, passageways 108, passageways 107 and 106, chamber 105, passageway 94, to chamber 93 and thence via passageway 96 and pipe 27 to chamber 25 in strut cylinder 19. Pressurization of chamber 93 moves selector valve device 88 leftward as viewed in FIG. 2, into an empty position subject to being moved to a loaded position dependent upon the action of the load measuring device 4. In an empty condition of a railway car, strut cylinder 19, FIG. 1, relative to the unsprung portion 18 of the car, assumes a position such that the stop member 23 will be relatively close to the stop member 17 since the car springs are not compressed as much as when the car is loaded. Therefore, upon pressurization of chamber 25 via passageway 96 and conduit 27, control piston 20 moves upwardly only a limited amount until stop member 23 engages stationary stop member 17. In this position of piston 20, passageway 29 will not be uncovered and communication will be closed between passageways 26 and 29. As the brake pipe pressure is increased further, pressurized fluid in chamber 55 forces the movable abutment 43 upwardly until the upper end portion of cylindrical follower member 45 engages annular flange member 42 to thereby stop the further upward movement of movable abutment 43. Increasing the brake pipe pressure to approximately 40 p.s.i. causes an increase in pressure in chamber 57 which overcomes the force of spring 54 to thereby move movable abutment 46 along with the valve stem 50 downwardly to a cut-off position, wherein passageway 114 is connected to passageways 112 and 107, whereby pressurized fluid from strut cylinder reservoir 109 and chambers 55 and 105 is vented to atmosphere (via passageways 111, 112, 106 and 107, the upper end portion of bore 36 and passageway 114). The venting of chamber 55 permits spring 54 to exert a downward force on movable abutment 43 to thereby move follower member 45 and cup-shaped diaphragm 44 downwardly until stop 39 is engaged. Venting of chambers 55 and 105 accomplishes a dual purpose, wherein it releases the spring force on movable abutment 46 thereby requiring a lower brake pipe pressure before the diaphragms 44 and 47 will reset themselves to their initial fully retracted position and again be ready for a weighing operation and, in addition thereto, it allows the latch spring 104 to move the latch piston 101 downwardly so that the lower end portion 102 of the latch piston 101 engages annular groove 99 on the selector valve device 88 to thereby secure the selector valve device 88 in the one of its positions in which it is shown. Such action assures that the selector valve device 88 is locked in its selected position prior to termination of the weighing operation.

With such movement of valve stem 50 to its cut-off position chamber 25 of strut cylinder 19 and chamber 93 are vented to atmosphere via passageway 26, pipe 27, passageways 96, 95, annular groove 52, passageways 110, 111, and 112, restricted opening 113, upper end portion of bore 36 and passageway 114, while strut cylinder reservoir 109 is vented to atmosphere via passageways 111, 112, restricted opening 113, upper end portion of bore 36 and passageway 114. It is to be noted that since the venting of strut cylinder reservoir 109 is delayed via restricted opening 113 in passageway 112, completion of the weighing operation and locking of selector valve device 88 in one of its positions is assured since chamber 105 is vented via port 114 at an unrestricted rate. When chamber 25 is vented, as just explained, control piston 20 and piston rod 21 in strut cylinder 19 are returned downwardly to their normal positions by spring 24. Pressurized fluid from auxiliary reservoir 6 and air reservoir 5 charges chamber 80 (FIG. 2), via conduit 11 and passageway 84, to thereby condition the change-over valve device 3 for a brake application in a manner to be described.

When brake pipe pressure is reduced under the control of an operator in the usual manner for causing a brake application, brake control valve device 1 operates to supply pressurized fluid from the auxiliary reservoir 6 and air reservoir 5 through the supply pipe 9, passageways 69 and 67 to chamber 65, whereby diaphragm 58 along with follower discs 60 and 61 move downwardly to exert a force on follower disc 62 which transmits this force to valve stem 71 to move valve stem 71 downwardly, as viewed in FIG. 2, such that the lower end portion of stem 71 unseats valve 78 to thereby cause flow of pressurized fluid from air reservoir 5 and auxiliary to the brake cylinders 14 via conduit 11, passageway 84, chamber 80, past unseated valve member 78, passageways 85, 87, and conduit 15. In addition, pressurized fluid from air reservoir 5 and auxiliary reservoir 6 flows, upon displacement of valve member 78, via passageway 85 and choke 86 to chamber 64 until sufficient force is developed in chamber 64 on diaphragm 59 to overcome the force developed in chamber 65 on diaphragm 58, whereupon the valve stem 71 is moved upwardly allowing spring-biased valve 78 to seat on the annular valve seat member 77 so that the further supply of fluid under pressure to the brake cylinders is cut off and the attained fluid pressure will be locked in the brake cylinder 14 for a braking application.

Since the effective area of diaphragm 58 and follower disc 60 is less than the effective area of diaphragm 59 and follower disc 63, the braking pressure developed in the brake cylinders 14 bears a relation to the pressure in chamber 65 which is in inverse ratio to the ratio of the effective areas of diaphragms 59 and 58.

Upon a further reduction in brake pipe pressure, fluid from air reservoir 5 and auxiliary reservoir 6 flows via supply pipe 9 through passageways 69 and 67 into chamber 65 to increase the pressure therein and cause diaphragm 58 to move downward as described above to force valve stem 71 downwardly and unseat valve member 78. Fluid under pressure from auxiliary reservoir 6 and air reservoir 5 then flows via conduit 11, passageway 84, chamber 80, past unseated valve member 78, passageways 85 and 87 and conduit 15 to the brake cylinders 14 to increase the brake application and simultaneously therewith fluid under pressure flows via choke 86 to the lower chamber 64 until the increased pressure in the lower chamber 64 develops sufficient differential force on diaphragm 59 and follower discs 63 and 62 to move diaphragm 58, valve stem 71, and follower discs 60 and 61 upward to permit the seating of spring-biased valve member 78 on annular valve seat member 77 to thereby terminate the further increase of brake cylinder pressure.

Restoration of the brake pipe pressure releases the brakes in a manner well understood in the art, and concurrently the fluid in chamber 65 of the differential relay valve is vented to atmosphere via passageways 67, 69, supply pipe 9 and brake control valve device 1, while simultaneously brake cylinders 14 are vented to atmosphere via conduit 15, passageways 87, 85, bore 74 and port 76.

Under such above-described conditions, load indicating chamber 122 is connected to atmosphere at all times via passageway 70, annular groove 100, passageway 124, and exhaust port 125, thereby maintaining indicator plunger 123 in its retracted position indicting an unloaded or empty condition of the railway car.

Let it now be assumed that the brake pipe 8 has been vented to atmosphere to effect an emergency application of the brakes, or at least to below 10 p.s.i. such that fluid pressure in charging pipe 115 and passageway 116 as well as chamber 57 is vented to atmosphere via pipe 115 and the brake control valve device 1, thereby subjecting follower disc members 48 and 49 along with valve stem 50 only to the force of spring 54 which thereby moves valve stem 50 along with follower disc members 48 and 49 upwardly until upper follower disc member 49 engages the upper end portion of bore 37. Such action conditions the change-over valve device 3 for a new cycle, wherein the load measuring device 4 operates to reset the change-over valve device 3 in accordance with the loaded or empty condition of the railway car.

It should be noted that the load measuring device 4 is actuated to register a loaded or empty condition of a railway car whenever an emergency brake pipe reduction has been effected, such that the valve stem 50 and the respective movable abutments 46 and 43 are returned to their neutral position in condition for directing fluid to chamber 25 in the load measuring device 4. Assuming a loaded condition of a railway car, the position of strut cylinder 19 relative to the unsprung portion 18 of the car is such as is shown in FIG. 1, wherein the stop member 23 on the movable piston rod 21 is relatively far from stop member 17 since the car springs are compressed to their full designed extent. Upon pressurization of chamber 25, control piston 20 will move upward with stop member 23 relative to the stop member 17 to such an extent as to connect passageway 29 to passageway 26.

Under such conditions of a loaded railway car with the cut-off valve device having movable abutments 43 and 46 in their neutral or released position, as shown in FIG. 2, initial charging of the brake pipe 8 from atmospheric pressure directs pressurized fluid through the brake control valve device 1 in the normal manner and thence through pipe 115 and passageway 116 to chamber 57 from whence it flows to strut cylinder reservoir 109 via passageways 110 and 111 and also to chambers 55 and 105 via passageway 108 and passageway 106. As the pressure increases, the movable abutment 43 moves upwardly, deflecting spring 54 until the upper end portion of cylindrical follower member 45 engages annular flange 42 thereby increasing the pressure needed on the smaller diaphragm 47 or the movable abutment 46 before it can move downwardly to its cut-off position. The pressurized fluid is also supplied via peripheral annular groove 53 on valve stem 50 and passageways 110 and 111 to the strut cylinder reservoir 109 to assure completion of the weighing operation before valve stem 50 is moved to its lower position.

When the pressure in chamber 105 overcomes the spring force of spring 104, the latch piston 101 moves upwardly and disengages the lower end stem portion 102 from the annular groove 99 of selector valve device 88 to thereby leave such selector valve device 88 free to move. Upward movement of the latch piston 101 communicates passageway 106 through chamber 105 to passageway 94 which thereby connects the pressurized fluid to the pressure chamber 25 in the load measuring mechanism 4 for a weighing operation. Under the assumed conditions of a loaded railway car as described above wherein the stop members 18 and 23 are relatively far apart, pressurization of chamber 25 causes the upward movement of the control piston 20 and stem 21 so that the stop member 23 engages the stop member 17 only after communication is established between passageways 26 and 29 to thereby interconnect conduits 27 and 30 so that the pressurized fluid flows from chamber 25 via conduit 30 and passageway 92 into chamber 91 which is at the left-hand end of selector valve device 88. Since the effective area of piston 89 is larger than the effective area of piston 90, the differential force developed therebetween upon pressurization of chambers 93 and 91 moves selector valve device 88 in a rightward direction, as viewed in FIG. 2, so that the peripheral annular groove 100 on the valve stem portion thereof communicates passageway 68 with passageway 70. As the brake pipe pressure increases, pressurized fluid in chamber 57 reacts upon the movable abutment 46 until spring 54 is overcome to thereby move the movable abutment 46 downwardly, as viewed in FIG. 2, to its cut-off position wherein valve stem 50 is moved to such a position wherein peripheral annular groove 52 thereon interconnects passageway 110 with passageway 95, and passageways 107 and 112 are vented via port 114. Pressurized fluid from chamber 55 is vented to atmosphere via passageways 106, 107 and port 114, while pressurized fluid from chamber 105 beneath latch piston 101 is vented to atmosphere via passageways 106 and 107 and port 114. In addition, pressurized fluid from strut cylinder reservoir 109 is vented to atmosphere via passageway 111, passageway 112, restricted opening 113 and port 114. It is noted that such passage of fluid is vented through a choke 113 to restrict or delay the flow of pressurized fluid from strut cylinder reservoir 109. Such action of venting chambers 55 and 105 results in reducing the spring force on movable abutment 46, which results in the requirement of a lower brake pipe pressure necessary before the valve stem 50 will reset and again be ready for a weighing operation. In addition, with chamber 105 vented, spring 104 forces latch piston 101 downwardly to have its lower end portion 102 engage annular groove 98 to thereby lock the selector valve device 88 in its right-hand position. Such movement of the movable abutment 46 and the valve stem 50 into cut-off position will also connect the strut cylinder reservoir 109 and the respective end chambers 91 and 93 of the selector valve device 88 to atmosphere through choke 113. Choke 113 restricts the flow of pressurized fluid from the chamber 91 and strut cylinder reservoir 109 to assure the locking of the selector valve device 88 in its right-hand position, since chamber 105 is vented to atmosphere at an unrestricted rate via passageways 106, 107 and port 114 to thereby move latch piston 101 downwardly prior to the venting of chambers 93 or 91. Chamber 91 is connected to atmosphere via passageway 92, conduit 30, passageway 29, chamber 25, passageway 26, conduit 27, passageway 96, passageway 95, peripheral annular groove 52, passageway 110, passageway 112, choke 113 and port 114. Strut cylinder reservoir 109 is connected to atmosphere via passageway 111, passageway 112, choke 113 and port 114. Downward movement of control piston 20 in strut cylinder 19 connects passageway 29 to atmosphere via port 22 such that chamber 91 is connected to atmosphere through port 22 via passageway 92 and conduit 30. The downward return movement of control piston 20 is aided by the biasing action of spring 24 located in strut cylinder 19.

When the railway vehicle is in the loaded condition as described above and the brake pipe pressure is reduced under control of an operator in the usual manner for initiating a braking application, brake control valve device 1 operates to supply fluid from auxiliary reservoir 6 and air reservoir 5 to supply pipe 9 which supplies pressurized fluid to the change-over valve device 3. Change-over valve device 3 conducts the pressurized fluid via passageway 69, passageway 67 to chamber 65 which acts on upper follower member 60 and resilient diaphragm 58 while simultaneously conducting fluid via passageway 69 to passageway 68, thence via peripheral annular groove 100 on selector valve device 88 to passageway 70 which conducts the pressurized fluid to the intermediate chamber 66 which balances the pressure acting in chamber 65 on diaphragm 58 and also provides a downward force acting on diaphragm 59 which is effective via valve stem 71 to unseat valve member 78. The effective downward force developed in chambers 65 and 66 will be substantially equal to the upward force developed in chamber 64 since the effective resultant areas of these diaphragms are equal in magnitude giving a one to one braking ratio. When valve stem 71 unseats valve member 78, chambers 80 and 81 are connected, whereupon the pressurized fluid from auxiliary reservoir 6 and air reservoir 5 flows via conduit 11 through passageway 84, chambers 80 and 81, thence via passageways 85 and 87 and conduit 15 to brake cylinders 14 for effecting a braking application.

Simultaneously with such flow of pressurized fluid to the brake cylinders 14, pressurized fluid flows through chamber 81, passageway 85, and choke 86 to chamber 64 until sufficient force is developed therein to overcome the force developed in the chamber 66 such that the valve stem 71 is moved upwardly by spring 75 allowing spring-biased valve 78 to seat on annular valve seat member 77 to thereby terminate the flow of pressurized fluid to the brake cylinders 14. In addition to such action, pressurized fluid flowing through passageways 69 and 68 additionally flows through peripheral annular groove 100 and passageway 70 upwardly into chamber 122 to exert an upward force on diaphragm 120 to thereby move indicator plunger 123 upwardly through the bore in the cup-shaped housing 119 to thereby visually indicate a brake application has been effected on a loaded railway car.

When the pressure in the brake pipe 8 is increased, brake control valve device 1 moves to its release position in a manner well understood in the art, whereupon the brake cylinders 14 are vented to atmosphere via conduit 15, passageways 87, 85, chamber 81, passageways 74 and 76, while the respective chambers 65 and 66 are vented to atmosphere via passageways 67, 69, conduit 9, and brake control valve device 1, and passageway 70, peripheral annular groove 100, passageways 68, 69, conduit 9 and brake control valve device 1. In addition, chamber 122 is vented to atmosphere via passageway 70, peripheral annular groove 100, passageways 68 and 69, supply pipe 9 and brake control valve device 1, thereby retracting plunger 123 from its projected position.

It will be noted that passageway 116 has a restricted opening closely adjacent to the connection to the pipe 115 for providing a throttling of the pressurized air in the case where a railway car has been cut out of the train and is then connected to a train that is fully charged to permit a weighing operation to be completed. Since the restricted opening would connect passageway 116 to the brake pipe 8 which in the train would be fully charged but on the railway car being coupled into the train would be at atmospheric pressure, it is necessary to throttle the entrance of pressurized fluid into passageway 116 to allow the cut-off valve device to go through its complete cycle to permit the load measuring device 4 to weigh the railway car and have selector valve device 88 moved to a position corresponding to a loaded or unloaded condition of the railway car in the manner fully described above.

It is to be noted that the extreme left-hand portion of sectionalized casing 31 which houses the stepped bore 33 and the differential relay valve comprises a main body section 126, an intermediate section 127 and an upper section 128.

Figure 3:
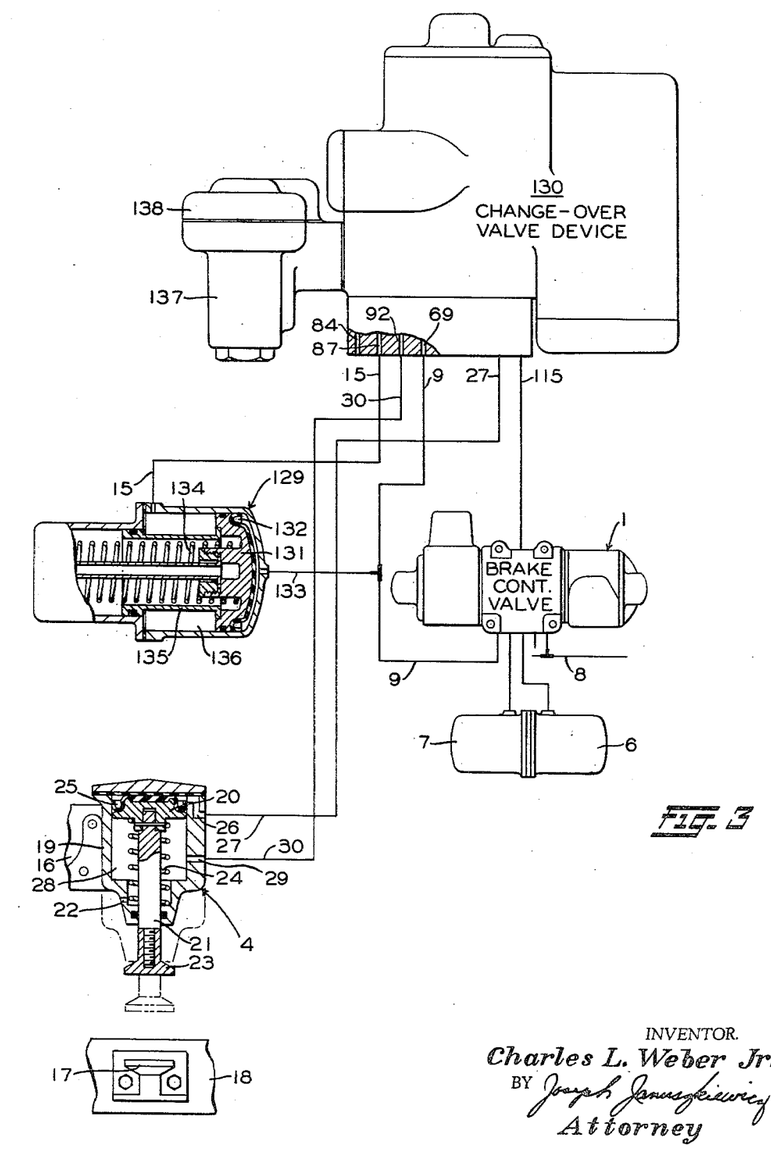
FIG. 3 is a diagrammatic view partly in section of a modified load-controlled fluid pressure brake apparatus for use with a compensating type brake cylinder constructed in accordance with the principles of this invention.
Figure 4:
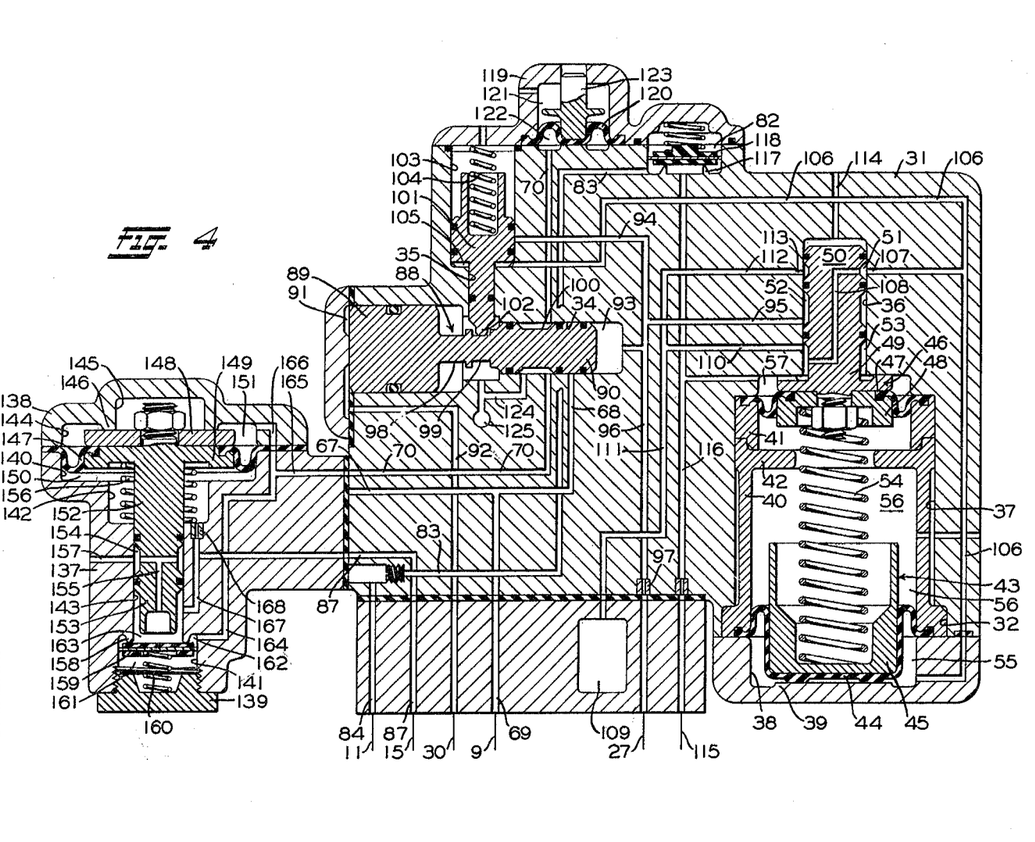
FIG. 4 is a side elevational, cross-sectional view of the change-over valve device shown in FIG. 3, this change-over valve device being a modification of the change-over valve device shown in FIG. 2.

FIGS. 3 and 4 of the drawings disclose a modified brake control system similar to the embodiment shown in FIGS. 1 and 2 wherein similar elements such as the brake control valve device 1, reservoirs 6, 7, supply pipe 9 and the load measuring device 4 retain the same numerals and operate in the same manner as discussed above.

The load measuring device 4 is similar in all respects to the previously discussed load device 4 in the embodiment of FIGS. 1 and 2, except that the load measuring mechanism 4 has the strut cylinder 19 inverted. However, it is similarly mounted on the sprung portion of the railway car.

The brake controlling valve device 1 is of the well-known type, such as the AB brake control valve device referred to in the explanation of FIGS. 1 and 2, and comprises valve means which is responsive to a service rate of reduction in pressure of fluid in the brake pipe below a normal charge value to supply fluid under pressure from an auxiliary reservoir 6 to a supply pipe 9 for causing a service application of brakes, responsive to an emergency rate of reduction in brake pipe pressure to supply fluid under pressure from the auxiliary reservoir 6 and also from an emergency reservoir 7 to supply pipe 9 for causing an emergency application of brakes, and responsive to an increase in brake pipe pressure following either a service or emergency application of brakes, to release fluid under pressure from supply pipe 9 causing a release of brakes and also connect the brake pipe 8 to the auxiliary reservoir 6 and emergency reservoir 7 for recharging such reservoirs to equal pressures with brake pipe fluid, as is well understood in the art. This is similar to the operation of the first disclosed embodiment.

In addition to the control valve device 1, load measuring device 4 and air reservoirs 6, 7, the fluid pressure brake equipment includes a brake cylinder device 129 and a load change-over valve device 130.

The brake cylinder device 129 comprises a casing containing a piston 131 slidably mounted therein. Piston 131 cooperates with a casing to define a pressure chamber 132 at the one end thereof which is connected by a conduit 133 to supply pipe 9 from brake control valve device 1. Pressurization of chamber 132 moves piston 131 in a leftward direction, as viewed in FIG. 3, for applying the brakes in a manner well understood in the art. Supply pipe 9, in addition to being connected to chamber 132 by conduit 133, is connected to passageway 69 in change-over valve device 130 for the same purpose as described in the prior embodiment. A spring 134 located in the casing of brake cylinder device 129 biases piston 131 in a rightward direction, as viewed in FIG. 3, to a brake releasing position in which it is shown. A cylinder 135 encircling the release spring 134 and attached at one end to piston 131 is slidably mounted adjacent its opposite end in the casing. Cylinder 135 cooperates with the piston 131 and the casing of brake cylinder device 129 to provide an annular load compensating chamber 136 around the cylinder 135 for receiving fluid under pressure from the conduit 15 connected to change-over valve device 130. As will later be described, when a vehicle is fully loaded chamber 136 will be vented during a braking application in order that the brakes on the vehicle will be applied to a degree governed by the full pressure of fluid in chamber 132 acting on piston 131. With a vehicle empty, a certain maximum pressure of fluid will be provided in chamber 136 whereby the degree of braking of the empty vehicle will be limited to the differential force between the opposing pressures in chambers 136 and 132.

The change-over valve device 130 is similar in all respects to the load change-over valve device 3 in the original embodiment except for the extreme left-hand portion of the sectionalized casing which, in place of sections 126, 127 and 128, contains a main body section 137, an upper section 138 and a plug 139 (FIG. 4) suitably connected together. Change-over valve device 130, except for the sections 137, 138 and plug 139, and its component parts, retains the same numerals and operates in the same manner as the original embodiment discussed above.

Main body section 137 of change-over valve device 130 (FIG. 4) has a stepped bore extending longitudinally therein having an enlarged upper bore portion 140, a lower reduced bore portion 141 and two adjacent intermediate bore portions 142 and 143. The upper section 138 of change-over valve device 130 is suitably recessed to provide a lower bore portion 144 and an upper bore portion 145 with an annular shoulder 146 intermediately thereof. The enlarged upper bore portion 140 of main body section 137 and the lower enlarged bore portion 144 of upper section 138 are of the same diameter to define a continuous bore.

Suitably located in the stepped bore is a resilient diaphragm 147 having its outer peripheral edge clamped between the upper casing 138 and the main body section 137 and its inner peripheral edge clamped between an upper follower disc 148 and a lower follower disc 149. Resilient diaphragm 147 and lower follower disc 149 cooperate with the main body section 137 and the stepped bore to define a lower chamber 150 while resilient diaphragm 147 and follower disc 148 cooperate with the bore 144 of the upper end section 138 to define an upper chamber 151. Follower discs 148 and 149 are suitably clamped together for movement with diaphragm 147. Lower follower disc 149 has a valve stem 152 extending downwardly therefrom, which valve stem 152 has a reduced end portion 153 and a peripheral annular groove 154 around the intermediate portion thereof. The lower portion of valve stem 152 has a bore 155 communicating the annular groove 154 with a recess in the central lower end portion thereof for a purpose to be described. Bore portions 142 and 140 of the stepped bore house a spring 156 which has one end seated on a recessed shoulder portion of the main body section 137 and its other end engaging a shoulder on the lower follower disc 149, thereby biasing diaphragm 147 and the follower discs 148 and 149 upwardly into engagement with the annular shoulder 146. In such biased position of valve stem 152, peripheral annular groove 154 vents the lower end portion of intermediate bore portion 143 of the stepped bore via bore 155 and through a port 157 extending through the main body section 137 of the sectionalized casing. The lower end portion of the stepped bore between bore portions 141 and 143 has a downwardly extending annular valve seat 158. A valve 159 is located below valve seat member 158 in bore portion 141, which valve 159 is normally biased upwardly into engagement with valve seat 158 by a spring 160. Valve 159 cooperates with the lower end portion of bore portion 141 to define a lower chamber 161 and cooperates with the upper end portion of bore portion 141 to define an outer annular chamber 162. Valve 159 when seated on annular valve seat member 158 cooperates with the lower bore portion of bore 143 to define a chamber 163. The outer chamber 162 and the lower chamber 161 are interconnected through a groove in the outer peripheral portion of valve 159 to provide equalization of pressures therebetween. Chambers 161 and 162 are connected to the bore 34 controlled by selector valve device 88 via passageways 164, 165 and passageway 70 in the main body portion of the sectionalized casing 31. Upper chamber 151 is connected to the bore 34 via passageways 166, 165 and 70.

In operation, the brake equipment described is initially charged by supplying fluid under pressure via the brake pipe 8 to the brake control valve device 1 and through such control valve device 1 in the usual manner to charge the auxiliary and emergency reservoirs 6 and 7, respectively. In addition, pressurized fluid from brake control valve device 1 flows via charging pipe 115, which charging pipe 115 is constantly open to the brake pipe through the brake control valve device 1, passageway 116 into chamber 57, and thence via peripheral annular groove 53 and passageways 110 and 111 to charge strut cylinder reservoir 109 while simultaneously flowing through peripheral annular groove 53 and passageway 108 in the valve stem 50 to passageway 106 which conducts pressurized fluid simultaneously to chambers 105 and 55 in a manner described in the original embodiment. As the brake pipe pressure is increased, chambers 105 and 55 are pressurized to thereby move abutment 43 upwardly prior to the downward movement of movable abutment 46 in the manner described previously. Such increase in the brake pipe pressure increases the pressure in chambers 55 and 105 causing the respective upward movement of movable abutment 43 (FIG. 4) to compress spring 54 and the upward movement of latch piston 101 to compress spring 104. When the pressure build-up in chamber 105 overcomes the force of spring 104, latch piston 101 moves upwardly and disengages the lower end portion 102 from the selector valve device 88 to thereby free selector valve device 88 for unrestricted rectilinear movement in bore 34. Such upward movement of latch piston 101 communicates passageway 106 with passageway 94 to thereby conduct pressurized fluid from the brake pipe via passageway 106 through chamber 105 to passageway 94 which is connected to chamber 93 and to the chamber 25, in strut cylinder 19, via passageway 96 and conduit 27, respectively. Pressurization of chamber 93 moves selector valve device 88 into an empty position (as shown in FIG. 4), subject to being moved to a loaded position dependent upon the action of the load measuring device 4.

In an empty condition of a railway car, strut cylinder 19 relative to the unsprung portion 18 of the car assumes a position such that the stop member 23 will be relatively far from the stop member 17 since the car springs are not compressed as much as when the car is loaded. Therefore, upon pressurization of chamber 25 via passageway 96 and conduit 27, control piston 20 moves downwardly until stop member 23 engages stationary stop member 17 such that control piston 20 interconnects passageways 26 and 29 (FIG. 3) to thereby conduct the pressurized fluid from conduit 27 into passageway 26, thence through chamber 25 and through passageway 29 into conduit 30 which directs the pressurized fluid through passageway 92 in change-over valve device 130 to chamber 91 where it moves selector valve device 88 rightwardly as viewed in FIG. 4. As the brake pipe pressure is increased further, pressurized fluid in chamber 55 forces the movable abutment 43 upwardly until the upper end portion of the cylindrical follower member 45 engages annular flange member 42 to thereby stop the further upward movement of movable abutment 43. Thereafter the build-up of pressure continues in chamber 57 to increase the brake pipe pressure therein to approximately 40 p.s.i. whereupon the pressurized fluid in chamber 57 overcomes the force of spring 54 to thereby move movable abutment 46 downwardly to a cut-off position as described in the original embodiment. In this cut-off position the chambers 55 and 105 are vented to atmosphere which completes the weighing cycle. As the chamber 105 is thus vented, the selector valve device 88 is locked in its right-hand position to thereby condition the braking apparatus for a brake application.

When brake pipe pressure is reduced under control of the operator in the usual manner to cause a brake application, the brake control valve device 1 operates to supply pressurized fluid from the auxiliary reservoir 6 through the supply pipe 9, to pressurize chamber 132 (FIG. 3) in brake cylinder device 129 while simultaneously flowing into passageways 69 and 68 and thence to the bore 34. In the empty car position as described above wherein selector valve device 88 is in the right-most position, as viewed in FIG. 4, annular groove 100 connects passageways 68 and 70 to thereby direct pressurized fluid simultaneously to chambers 151 and 162. Pressurization of chamber 151 exerts a downward force on diaphragm 147 and valve stem 152, such that stem 152 unseats valve 159 and connects pressurized fluid from chambers 162 and 161 to the load compensating chamber 136 in brake cylinder device 129 via passageways 167 and 87 and conduit 15. It is to be noted that before pressurization of chamber 151 unseats valve 159, such pressurization must overcome the biasing action of spring 156 such that there is a sufficient time lag to permit sufficient force to be developed in pressure chamber 132 of the brake cylinder device 129 to bring the brake shoes into engagement with the tread of the wheel to condition the brake cylinder device 129 for a proper braking application. With the same fluid pressure in the main pressure chamber 132 and in the compensating chamber 136 of the brake cylinder device 129, the brakes on the empty vehicle for a given reduction in pressure of fluid in the brake pipe will effect a limited braking action due to the differential forces developed by the substantially equal pressures in chambers 132 and 136 acting on different opposing effective areas of the brake cylinder piston 131.

When it is desired to effect a release of the brakes, the brake pipe pressure will be increased in the usual manner causing the brake control valve device 1 to establish communication from the brake pipe to charge the respective reservoirs 6 and 7 while establishing communication from the respective chambers 132 and 136 of brake cylinder device 129 to the supply pipe 9, which supply pipe 9 is connected to atmosphere, thus venting main pressure chamber 132 and the compensating chamber 136, so that with the aid of spring 134, the brakes on the railway car are fully released.

Choke 168 interconnected between passageway 167 and chamber 150 restricts the flow of pressurized fluid from chamber 161 to chamber 150 to thereby delay the building up of pressure therein to assure a proper braking application prior to the pressurization of chamber 150 to a degree which overcomes the force developed on diaphragm 147 from the pressurization of chamber 151. Upon equalization of pressures in chambers 150 and 151, diaphragm 147 along with follower members 148 and 149 and valve stem 152 are moved upwardly by spring 156 relative to the valve 159 thereby releasing the force exerted thereon to permit the spring 160 to return valve 159 upwardly to seat on annular valve seat member 158 and thereby cut off the further flow of fluid to the load compensating chamber 136.

Assuming that the railway car is loaded, the stop member 23 on strut cylinder 19 is relatively close to the stop member 17 since the stop member 23 is on the sprung portion of the railway car and the springs supporting the sprung portion are compressed in accordance with the degree of loading, which in the case of a loaded condition of a railway car would be relatively greater than under an unload condition of a railway car.

Pressurization of chamber 25 via conduit 27 moves piston 20 downwardly only a limited distance due to engagement of stop member 23 by stop member 17. In this position of piston 20, passageway 29 will not be uncovered and communication will be closed between passageways 26 and 29.

Under these assumed conditions of a loaded railway car, pressurization of the brake pipe 8 causes the pressurized fluid to flow through the brake control valve device 1 to pipe 115 and passageway 116, thence to chamber 57, from whence it flows to charge strut cylinder reservoir 109, chamber 105 and chamber 55 as described more fully above. Pressurization of strut cylinder reservoir 109 provides a pressure supply source which assures the completion of the weighing operation in a manner described above. Charging of chamber 105 moves latch piston 101 upwardly to unlock the selector valve device 88 for movement to a position in accordance with the loaded or unloaded condition of the railway car which, in the present example, will be the loaded car position. Such upward movement of latch piston 101 communicates passageway 106 with passageway 94 to thereby conduct pressurized fluid from the brake pipe 8 via passageway 106 through chamber 105 to passageway 94, and thence to chamber 93 and, in addition thereto, to thereby conduct pressurized fluid via passageways 94 and 96 and conduit 27 to chamber 25 in strut cylinder 19. Pressurization of chamber 93 moves selector valve device 88 into a loaded position, subject to being moved in a rightward direction, as viewed in FIG. 3, dependent upon the action of the load measuring device 4. In the loaded condition of the railway car, passageway 29 in strut cylinder 19 (FIG. 3) will not be uncovered and communication will be closed between passageways 26 and 29. As the brake pipe pressure is increased further, pressurized fluid in chamber 55 forces the movable abutment 43 upwardly until the upper end portion of cylindrical follower member 45 engages annular flange 42 to thereby stop the further upward movement of the movable abutment 43. Thereafter, the build-up of pressure in chamber 57 increases until a pressure of approximately 40 p.s.i. is attained, which pressure forces movable abutment 46 along with valve stem 50 downwardly against the bias of spring 54 to the cut-off position. Such action vents chamber 55, chamber 93, and chamber 105 via passageways 94, 106, 107 and port 114 at an unrestricted rate while simultaneously venting strut cylinder reservoir 109 at a restricted rate as more fully discussed above.

The venting of chamber 105 to atmosphere underneath the latch piston 101 allows the force of spring 104 to return latch piston 101 downwardly such that the lower end portion 102 engages groove 99 of selector valve device 88 as shown in FIG. 4, thereby maintaining selector valve device 88 in its loaded position until such time that the brake pipe pressure is reduced to atmosphere.

When brake pipe pressure is reduced under control of the operator in the usual manner for causing a brake application, brake control valve device 1 operates to supply fluid from the auxiliary reservoir 6 to the brake supply pipe 9, thence via branch conduit 133 to the main pressure chamber 132 to thereby move piston 131 leftward, as viewed in FIG. 3, to effect a braking application. Under this fully loaded vehicle condition, the vehicle brakes will therefore be applied with a force equal only to the pressure of fluid in the main pressure chamber 132 acting on piston 131. The load compensating chamber 136 is now vented to atmosphere via conduit 15, passageway 87, passageway 167, chamber 163, passageway 155 and port 157. When it is desired to release the brakes on the vehicle, fluid under pressure will be built up in the brake pipe 8 and pressurized fluid in supply pipe 9 will be vented to atmosphere via the brake control valve device 1 in a manner well known in the art to thereby vent main chamber 132 which is connected to supply pipe 9.

Figure 5:
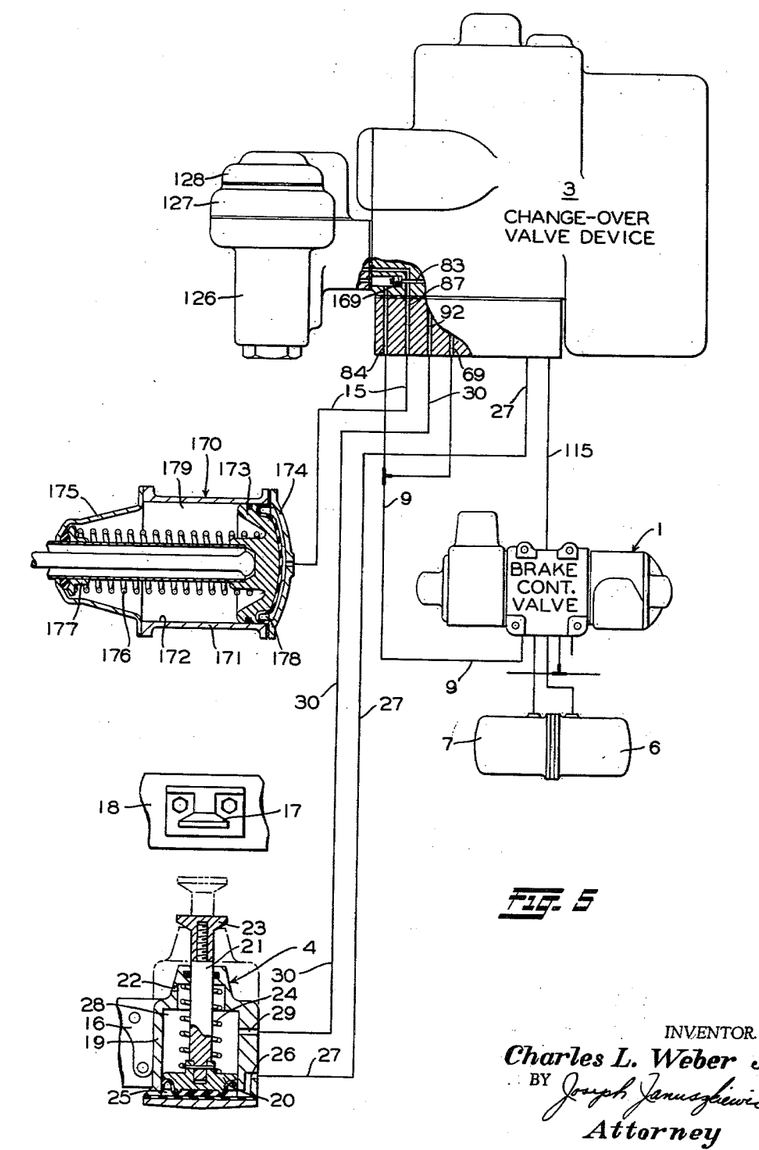
FIG. 5 is a diagrammatic view partly in section of a modified load-controlled fluid pressure brake apparatus for use with a single capacity brake cylinder constructed in accordance with the principles of this invention.

FIG. 5 of the drawings discloses a modified brake control system similar to the embodiment shown in FIGS. 1 and 2, wherein similar elements such as the brake control valve device 1, reservoirs 6 and 7, load measuring device 4 and the change-over valve device 3 retain the same numerals and operate in the same manner as discussed above. Load measuring device 4 is similar in all respects to the previously-discussed load measuring device 4 in the embodiment of FIG. 1.

The only difference in structure with respect to the embodiment shown in FIGS. 1 and 2 are as follows: (a) a plug 169 is located in passageway 83 closely adjacent the main body section 126, (b) supply pipe 9 is connected to passageway 84 in addition to being connected to passageway 69 as in the original embodiment, and (c) a single capacity brake cylinder 170 is used in lieu of the brake rigging 2 shown in FIG. 1, which uses the large capacity brake cylinders 14 having large variation in piston travel.

Brake cylinder device 170 comprises a cylindrical body or casing section 171 which has a longitudinal bore 172 extending therethrough. A piston 173 is slidably mounted in the bore 172 which is closed at one end by a pressure head 174 secured in a suitable manner to casing section 171 and closed at the opposite end by a non-pressure head 175 suitably secured to the casing section 171. A release spring 176 is interposed between the piston 173 and a spring seat 177, which release spring 176 serves to yieldingly bias the piston 173 to a brake releasing position from a brake applied position. The piston 173 cooperates with the pressure head 174 and the casing section 171 to define a pressure chamber 178 to which fluid under pressure may be supplied through conduit 15 in the manner described in connection with the original embodiment. Piston 174 cooperates with the non-pressure head 175 and the casing section 171 to define a non-pressure chamber 179 which houses the release spring 176. Brake cylinder device 170 is referred to as a single capacity brake unit whose working capacity is relatively small as compared to the cylinders 14 of the brake rigging shown in FIG. 1, which cylinders 14 are considered a variable capacity braking unit requiring considerably more fluid for performing a braking application.

The operation of the brake control system shown in FIG. 5 is similar in all respects to the original embodiment except that since no supplementary reservoir, such as the reservoir 5 shown in FIG. 1, is used, supply pipe 9 is connected to both passageways 84 and 69, as shown in FIG. 5. Therefore, upon a reduction in brake pipe pressure, pressurized fluid flows from the auxiliary reservoir 6 through the brake control valve device 1, via supply pipe 9, passageway 84 to charge chamber 80 (FIG. 2) preliminary to the unseating of the valve 78 by the flow of pressurized fluid from the supply pipe 9, passageway 69, to either charge chamber 65 or chambers 65 and 66, dependent on the position of the selector valve device 88 as fully discussed above, to provide either a full braking application or a compensated type braking application.

FIGS. 1 and 3 show the load measuring device in alternate positions to illustrate that under the first condition, such as FIG. 1, a full travel of the strut cylinder indicates a loaded railway car, where a rupture or breaking of conduit 27 connected to pressure chamber 25 would cause the change-over valve device 3 to be set for an empty car condition since chamber 91 (FIG. 2) would not be pressurized, thereby resulting in giving an empty car braking ratio; whereas, under the conditions of FIGS. 3 and 4 where a full travel indicates an empty railway car, a breaking of conduit 27 would cause the change-over valve device 130 to be set for a loaded car resulting in giving a loaded car braking ratio. Thus, whether it is desired to give a loaded car braking ratio or an empty car braking ratio in case of rupture of the cinduit 27, this can be achieved by inverting the strut cylinder 19 or by changing the selector valve 88, such that any desired connection is either made or closed between passageways 68 and 70 (FIG. 2). Such versatility enhances the degree of application.

It will be appreciated that the invention may be practiced with other modifications without departing from the spirit or scope of the invention as set forth in the appended claims.

Having now described the invention, what I claim as new and desire to secure by Letters Patent, is:

1. A load compensating brake system comprising:
   (a) a brake pipe,
   (b) a compensating type brake cylinder having a main chamber and a compensating chamber for effecting a braking application wherein pressurization of said main chamber provides one braking force and pressurization of both of said chambers provides a lesser braking force,
   (c) brake controlling means responsive to a reduction in pressure in said brake pipe to supply fluid under pressure to a first conduit, and responsive to a subsequent increase in brake pipe pressure to release fluid under pressure from said first conduit,
   (d) said main chamber connected to said first conduit,
   (e) a change-over valve device having selector valve means operable between a first and second position,
   (f) means for selectively positioning said selector valve means including a load measuring device,
   (g) relay valve means cooperative with said selector valve in one of said positions only for connecting said compensating chamber of said brake cylinder to said first conduit upon actuation thereof, and
   (h) said relay valve cooperative with said selector valve means in said one position for actuation subject to pressurization of said first conduit.

2. A load compensating brake apparatus for a railway vehicle comprising:
   (a) a brake pipe,
   (b) a brake cylinder having differential piston means, a main pressure chamber and a compensating pressure chamber,
   (c) said differential piston means providing one braking force or a greater braking force as both of said chambers are charged or only said main chamber is charged,
   (d) brake controlling means responsive to a reduction in pressure in said brake pipe to supply fluid under pressure to a first conduit, and responsive to a subsequent increase in brake pipe pressure to release fluid under pressure from said first conduit,
   (e) selector valve means operable between a first and second position,
   (f) means for positioning said selector valve means in accordance with the loading of such a railway vehicle into a first or a second position,
   (g) said main chamber operatively connected to said first conduit,
   (h) relay valve means cooperative with said selector valve in said first position to connect pressurized fluid from said first conduit to said compensating chamber subject to actuation of said relay valve means, and
   (i) said selector valve means in said first position operative to connect said first conduit to said relay valve means to actuate said relay valve means upon pressurization of said first conduit.

3. A load compensating brake apparatus for a railway vehicle comprising:
   (a) a brake pipe, (b) a brake cylinder having differential piston means cooperative therewith to define a main chamber and a compensating chamber, (c) said differential piston means having one portion thereof acting in said compensating chamber of a smaller effective area than another portion of said differential piston acting in said main chamber for providing one braking ratio or a greater braking ratio as both of said chambers are charged or only said main chamber is charged, (d) brake controlling means responsive to a reduction in pressure in said brake pipe to supply fluid under pressure to a first conduit, and responsive to a subsequent increase in brake pipe pressure to release fluid under pressure from said first conduit, (e) selector valve means operable between a first and second position, (f) means for positioning said selector valve means into said first or second position in accordance with the loading of such a railway vehicle, (g) said main chamber operatively connected to said first conduit, (h) relay valve means comprising:
  (i) a casing,
  (ii) a diaphragm cooperative with said casing to define a pair of spaced chambers,
  (iii) a valve stem operatively connected to said diaphragm for movement therewith,
  (iv) a normally seated spring-biased valve means cooperative with said casing to define a pressure chamber,
  (v) one of said pair of chambers and said pressure chamber connected to a second conduit, (i) said selector valve means in said first position operative to block communication between said first and second conduits and operative in said second position to establish communication between said first and second conduit, (j) pressurization of said one chamber being operative to displace said diaphrgarm and valve stem to unseat said valve means to connect said pressure chamber to said compensating chamber via a passageway, and (k) the other of said pair of chambers operatively connected to said passageway through a choke for pressurization thereof to balance pressurization of said one chamber.

4. A load compensating brake apparatus as set forth in claim 3 wherein:
  (a) said other chamber houses means for biasing said diaphragm and valve stem away from said valve means to require a predetermined force in said one chamber prior to unseating of said valve means thereby pressurizing said main chamber by a predetermined amount prior to the unseating of said valve means.

5. In an empty and load brake apparatus for a vehicle, the combination of:
  (a) a brake pipe,
  (b) a brake cylinder,
  (c) brake controlling means responsive to a reduction in pressure in said brake pipe to supply fluid under pressure to a first conduit and responsive to a subsequent increase in brake pipe pressure to release fluid under pressure from said first conduit,
  (d) a change-over valve mechanism comprising a first differential piston valve means operative in a first position to communicate said first conduit to a second conduit and operative in a second position to block communications between said first conduit and said second conduit,
  (e) means for selectively positioning said differential piston valve means including a load measuring device,
  (f) latch means normally biased for locking said differential piston valve means in said first or second position,
  (g) said latch means operative upon actuation thereof to release said differential piston for movement,
  (h) valve means operative in a first position for establishing communications from said brake pipe simultaneously to a reservoir and to said latch means for actuation thereof,
  (i) said valve means movable from said first position to a second position upon establishing a predetermined pressure in said brake pipe,
  (j) said valve means operatively connected to said brake pipe and responsive to pressure therefrom,
  (k) a relay valve device operative upon actuation thereof to connect pressurized fluid from a pressure source via a passageway to said brake cylinder for a braking application,
  (l) said relay valve device having spaced differential piston means for providing an actuating force proportional to energization of one or both of said differential piston means,
  (m) said first conduit operatively connected to one of said differential piston means,
  (n) the other of said differential piston means operatively connected to said second conduit, and
  (o) said relay valve device having a balancing chamber operatively connected to said passageway for pressurization thereof to deactuate said relay valve device and vent said brake cylinder.

6. In an empty and load brake apparatus as set forth in claim 5 wherein:
  (a) said valve means is operative in said second position for blocking communication between said brake pipe and said reservoir, and between said brake pipe and said latch means,
  (b) said valve means in said second position operative to vent said latch means at an unrestricted rate and vent said reservoir at a restricted rate while simultaneously connecting said reservoir to said load measuring device.

7. In an empty and load brake apparatus for a vehicle, the combination of:
  (a) a brake pipe,
  (b) a brake cylinder for effecting a braking application,
  (c) brake controlling means responsive to a reduction in pressure in said brake pipe to supply fluid under pressure to a first conduit, and responsive to a subsequent increase in brake pipe pressure to release fluid under pressure from said first conduit,
  (d) a change-over valve device having a selector valve means operable between a first and a second position,
  (e) means for selectively positioning said selector valve means in a first or second position wherein said means includes a load measuring device,
  (f) latch means normally biased into locking engagement with said selector valve for maintaining said selector valve in said first or second position,
  (g) said latch means subject to being actuated by pressurization thereof to free said selector valve means for unrestricted movement,
  (h) cut-off valve means operable upon a rising pressure in said brake pipe from a predetermined low pressure for pressurizing said latch means,
  (i) said latch means operable upon actuation thereof to pressurize said load measuring device and pressurize said selector valve for movement into said first position,
  (j) said load measuring device is operable upon actuation to register a variable operating condition wherein one of such conditions is effective to move said selector valve means into said second position via pressure fluid means,
  (k) said cut-off valve means being responsive to a pressure higher than said predetermined low pressure following such rising pressure in said brake pipe for deactuating said latch means, and isolating and venting said selector valve from all pressure fluids thereby locking said selector valve in one of said two positions, (l) relay valve means operable upon actuation to connect pressure fluid to said brake cylinder for a braking application, and (m) said relay valve means cooperative with said selector valve means in said first position to condition said brake cylinder means to provide one braking force and cooperative with said selector valve in said second position to condition said brake cylinder means to provide a second braking force which second braking force is greater than said first braking force.

8. In an empty and load brake apparatus for a vehicle as set forth in claim 7 wherein:

(a) said cut-off valve means is operative to deactivate said latch means at an unrestricted rate while venting pressure fluids from said selector valve and said load measuring device at a restricted rate.

9. In an empty and load brake apparatus for a vehicle as set forth in claim 8 wherein:

(a) said relay valve means has a balancing chamber operatively connected to said brake cylinder via a restricted opening to provide a balancing force in said balancing chamber opposite in direction to the force actuating said relay valve means.

10. In an empty and load brake apparatus for a vehicle, the combination of:

(a) a brake pipe, (b) a brake cylinder for effecting a braking application, (c) a casing, (d) brake controlling means responsive to a reduction in pressure in said brake pipe to supply fluid under pressure to a first conduit, and responsive to a subsequent increase in brake pipe pressure to release fluid under pressure from said first conduit, (e) said casing having a normally closed valve means operative upon actuation thereof to connect pressurized fluid from a pressure source via a supply pipe to said brake cylinder for a brake application, (f) a relay valve means in said casing having spaced control chambers operative upon selective energization thereof of either or both chambers to actuate said valve means, (g) said relay valve means having a balancing chamber connectable to said supply pipe for balancing said energization of said control chambers, (h) said control chambers being of different effective areas to provide different actuating forces dependent upon which of said control chambers are actuated, (i) one of said control chambers being connected to said first conduit for providing one braking ratio, (j) a differential piston valve means inoperative in a first position and operative in a second position to connect said first conduit to the other of said control chambers for energization thereof for providing a greater braking ratio than said one braking ratio, (k) locking means normally operable to lock said differential piston valve means against movement, and (l) means for temporarily deactuating said locking means for freeing said differential piston valve means for movement while simultaneously positioning said differential piston valve means into either said first or said second position.

11. In an empty and load brake apparatus for a vehicle, the combination comprising:

(a) a brake pipe, (b) a brake cylinder for effecting a braking application, (c) brake controlling means responsive to a reduction in pressure in said brake pipe to supply fluid under pressure to a first conduit, and responsive to a subsequent increase in brake pipe pressure to release fluid under pressure from said first conduit, (d) a normally closed valve means operative upon actuation thereof to connect pressurized fluid from said first conduit to said brake cylinder for a brake application, (e) a relay device having differential piston means subject to fluid pressure in a pair of control chambers of different effective areas opposing fluid pressure in a balancing chamber wherein said effective areas of said control chamber provide one braking ratio or a greater braking ratio according as one of said control chambers is charged or both of said control chambers are charged with fluid under pressure to thereby actuate said valve means, (f) one of said control chambers being connectable to said first conduit, (g) a differential piston valve means inoperative in a light load condition of a railway car and operative in a loaded condition of a railway car to connect said first conduit to the other of said control chambers for providing said greater braking ratio, (h) means for selectively positioning said differential piston valve means into a first or second position, and (i) lock means cooperative with said last-mentioned means for locking said differential piston valve means against movement upon a predetermined pressure build-up in said brake pipe.

12. In an empty and load brake apparatus for a vehicle as set forth in claim 11 wherein:

(a) said balancing chamber is operatively connected to said brake cylinder through a restricted port.

References Cited by the Examiner

UNITED STATES PATENTS

| | | | |
|---|---|---|---|
| 2,858,166 | 10/58 | Thomas | 303—22 |
| 2,919,165 | 12/59 | Cotter et al. | 303—22 |
| 2,940,799 | 6/60 | Seger | 303—23 X |
| 2,986,427 | 5/61 | McClure et al. | 303—6.1 |
| 3,136,588 | 6/64 | McClure | 303—23 |

EUGENE G. BOTZ, *Primary Examiner.*

ARTHUR L. LA POINT, *Examiner.*